United States Patent
Baek et al.

(10) Patent No.: US 6,444,600 B1
(45) Date of Patent: Sep. 3, 2002

(54) HIGH STRENGTH LIGHT-WEIGHT CERAMIC INSULATOR

(75) Inventors: Yong Kee Baek, Taejon; Sang Ju Kwak, Seoul; Hak Sung Park; Jong Uk Yoon, both of Suwon, all of (KR)

(73) Assignee: Agency for Defense Development, Daejon (KR)

( * ) Notice: Subject to any disclaimer, the term of this patent is extended or adjusted under 35 U.S.C. 154(b) by 76 days.

(21) Appl. No.: 09/613,156

(22) Filed: Jul. 10, 2000

(30) Foreign Application Priority Data

Jul. 12, 1999 (KR) .............................. 99-28003

(51) Int. Cl.⁷ .............................................. C04B 35/80
(52) U.S. Cl. ..................... 501/95.1; 501/95.2
(58) Field of Search ............... 501/95.1, 95.2, 501/35, 36

(56) References Cited

U.S. PATENT DOCUMENTS

| | | | |
|---|---|---|---|
| 3,835,054 A | | 9/1974 | Olewinski et al. |
| 4,127,556 A | * | 11/1978 | Ushitani et al. ............. 252/62 |
| 4,174,331 A | | 11/1979 | Myles |
| 4,248,752 A | * | 2/1981 | Myles ...................... 260/29.1 |
| 4,650,775 A | | 3/1987 | Hill |
| 4,737,326 A | | 4/1988 | Wirth et al. |
| 4,857,489 A | * | 8/1989 | Bearden .................... 501/95.1 |
| 5,053,362 A | * | 10/1991 | Chi et al. .................. 501/95.1 |
| 5,155,070 A | * | 10/1992 | Skorupa .................... 501/103 |
| 5,268,031 A | * | 12/1993 | Lassiter et al. ............. 106/634 |
| 6,287,994 B1 | * | 9/2001 | Hart ............................ 501/12 |

* cited by examiner

*Primary Examiner*—Karl Group
(74) *Attorney, Agent, or Firm*—Scully, Scott, Murphy & Presser

(57) ABSTRACT

The present invention relates to a high strength light-weight ceramic insulator and a method for manufacture thereof wherein the light-weight ceramic insulator may be used at a high temperature by using a heat-resisting ceramic fiber. A colloidal silica or colloidal alumina which is an inorganic binder, and a methyl cellulose or a liquid-phase organic polymer which is an organic binder are added to an alumina-silica-based fiber containing zirconia, a concentration thereof is adjusted, a slurry is vacuum-molded, and drying and heating are carried out, thereby fabricating the ceramic insulator. Here, it is possible to fabricate the high strength light-weight ceramic insulator by artificially selectively positioning the inorganic binder to a contact point of the fibers.

5 Claims, 2 Drawing Sheets

HIGH STRENGTH LIGHT-WEIGHT CERAMIC INSULATOR

BACKGROUND OF THE INVENTION

1. Field of the Invention

The present invention relates to a high strength light-weight ceramic insulator and a method for manufacture thereof wherein the light-weight ceramic insulator may be used at a high temperature by employing a thermal resistant ceramic fiber.

2. Description of the Background Art

A ceramic insulator using a conventional ceramic fiber has improved mechanical strength and physical property by utilizing a large amount of an organic/inorganic binder or filler. In this case, a density of the ceramic insulator is increased due to large amount of binder used. Accordingly, the conventional ceramic insulator cannot be used for the products requiring superior thermal and mechanical properties at a low density. (U.S. Pat. No. 3,835,054; 4,174,331; 4,650,775; and 4,737,326)

SUMMARY OF THE INVENTION

It is therefore an object of the present invention to provide a high strength light-weight ceramic insulator which have good physical properties at a low density with only a small amount of a binder, by selectively controlling and concentrating an organic/inorganic binder on a contact point between fibers.

In order to achieve the above-described object of the present invention, there is provided a high strength light-weight ceramic insulator comprising: alumina-silica-based ceramic fibers containing zirconia; and organic and inorganic binders concentrated on a contact point between the fibers.

There is also provided a method for fabricating a high strength light-weight ceramic insulator, comprising the steps of: forming ceramic fibers by using silica, alumina and zirconia; making a slurry by adding organic and inorganic binders to the ceramic fibers; molding the slurry in vacuum to form ceramic fibers; drying the ceramic fibers; and heating the dried ceramic fibers.

BRIEF DESCRIPTION OF THE DRAWINGS

The present invention will become better understood with reference to the accompanying drawings which are given only by way of illustration and thus are not limitative of the present invention, wherein.

DETAILED DESCRIPTION OF THE PREFERRED EMBODIMENTS

Figure 1:
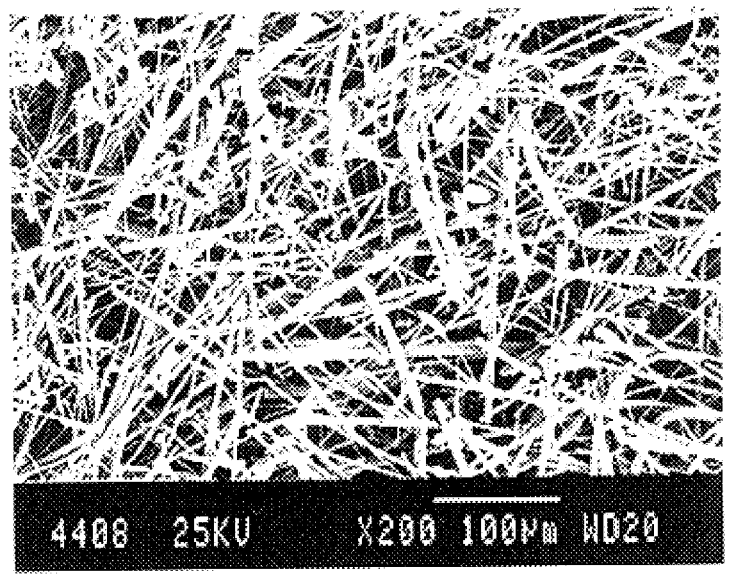
FIG. 1 is a scanning electron microscope photograph showing a ceramic insulator in accordance with the present invention.

In accordance with the present invention, a colloidal silica or colloidal alumina corresponding to 3 to 10 wt % of a fiber is used as an inorganic binder having a high strength at a high temperature, and methyl cellulose or polyacrylamide-based copolymer emulsion corresponding to 1.7 to 3.3 wt % of the fiber is utilized as an organic binder having a high strength at a room temperature.

The ceramic insulator according to the present invention has good thermal and mechanical properties at a low density.

Here, the ceramic fiber is an alumina-silica-based fiber containing zirconia formed by melting silica, alumina and zirconia materials in an electric furnace by a blowing method. In regards to each composition, silica is 35 to 47 wt %, alumina is 30 to 50 wt % and zirconia is 15 to 23 wt %. The safe temperature of use is 1430° C., and an average diameter of the fiber is 3.0 to 3.5 $\mu$m. In order to fabricate the ceramic insulator according to a vacuum-molding method, a size of a screen network in a grinder is controlled, and a length of the ceramic fiber is adjusted by grinding, in order for the average length to be between 100 and 900 $\mu$m. By means of controlling the length of the ceramic fibers, the ceramic fibers have a density of approximately 120 to 350 kg/m$^3$, that is the scope of fibers filling rate in the ceramic insulator is approximately 5 and 13%. In order to improve the thermal and mechanical properties, suitable organic and inorganic binders are selected, an orientation distribution of the ceramic fibers which form a base of the ceramic insulator is induced to a three-dimensional shape, and the bonding of the ceramic fibers is efficiently maximized.

On the other hand, a content of shots, unfiberized particles, having a particle diameter of over 50 $\mu$m in the fiber aggregate is maintained below 1 wt % by a preprocess of removing the shots generated during the fiber forming process from the ground ceramic fibers by using a shot removing device. Accordingly, the ceramic insulator is fabricated by using the high-purity fibers, thereby lowering a thermal conductivity, and improving a mechanical strength. Moreover, it is possible to fabricate a light-weight ceramic insulator.

An appropriate binder is necessary to form an aggregate at the high and room temperatures by employing the pre-processed ceramic fibers. The binder is artificially selectively positioned at a contact point of the fibers, thus fabricating the high strength light-weight ceramic insulator.

In general, electric charges on the surface of the ceramic fiber are weak negative charges. When bonded to the colloidal silica which has strong negative charges, the ceramic fiber cannot smoothly bond to the colloidal silica because of an electric repulsive force. Thus, two materials having the same surface charges are bonded by employing an aggregating agent having opposite charges or by controlling the pH of a slurry. However, according to the aggregating agent or pH control, a bonding size of the colloidal silica, namely an aggregation size is increased, and thus aggregates are spread on the surface of the fiber, and not at the contact point of the fibers. As a result, considering the amount of the binder used, a bonding force of the fibers is not remarkably improved. Accordingly, in order to concentrate the binder on the contact point of the fibers, it is necessary to properly control the size of the aggregate of the binder.

According to a preferable embodiment of the present invention, the particle size of the colloidal silica to be aggregated is adjusted by using a soluble polyacrylamide-based copolymer emulsion which was controlled an amount of positive charges on the surface. Here, the bonded copolymer and colloidal silica exist on the contact point of the fibers during a drying step, and thus a high mechanical strength is obtained even though a small amount of the inorganic binder is used. In addition, in order to more easily concentrate the binder on the contact point of the fibers during the drying step, a viscosity of the slurry is controlled by using a methyl cellulose-based thickening agent.

In the case only the colloidal silica is used as the inorganic binder, during the drying step after the vacuum-molding process, a large amount of the binder is moved to the surface causing the distribution to be uneven at the inner and outer portions of the ceramic insulator, and a deviation of the volume fraction is increased, thereby deteriorating the thermal and mechanical properties of the ceramic insulator. Especially, the bonding forcing at the inner portion of the ceramic insulator is considerably decreased due to movement of the inorganic binder, and thus the strength thereof is relatively low. In accordance with the embodiment of the present invention, in order to overcome such a disadvantage, there are employed colloidal silica, as an inorganic binder, and an organic agent which have negative ions at its surface, or colloidal alumina which is an inorganic binder having positive ions at its surface. In addition, in order to maximize the bonding power in the drying step, the size of the inorganic binder is properly controlled, thereby restricting movement of the binder toward the surface of a molding body. Furthermore, the distribution of the binder is more concentrated on the contact point of the fibers constituting the base of the inner portion of the ceramic insulator, thereby improving the physical properties thereof.

A method for fabricating the ceramic insulator in accordance with an embodiment of the present invention will now be explained.

Firstly, a slurry is formed by adding an organic/inorganic binder to ceramic fibers, and then the slurry is vacuum-molded to form a body. Next, the body is dried by using a microwave heating device in order to reduce the movement of the binder. Since a ceramic insulator is utilized at a high temperature, shrinkage takes place due to a phase transformation in the ceramic fibers from an amorphous to crystalline. In order to prevent shrinkage in advance and to improve the strength at a high temperature, the dried body is additionally heated at a temperature between 1000 and 1400° C. for 1 to 3 hours.

The constitution and operation of the present invention will now be described in detail by means of comparison between the Example of the present invention and comparative examples.

EXAMPLE OF THE PRESENT INVENTION

Figure 2:
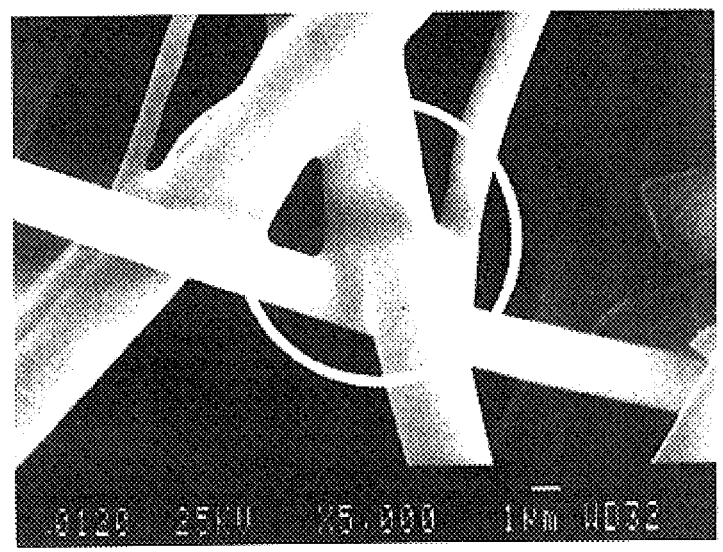
FIG. 2 is a high-magnification scanning electron microscope photograph showing the ceramic insulator in accordance with the present invention.

A size of a screen network in a grinder was adjusted to 5 mm, and a alumina silica fiber added with zirconia was grounded to have an average fiber length of 250 to 300 $\mu$m. Thereafter, shots having a particle diameter of over 50 $\mu$m was removed by using a shot removing device. The content of the shots having a particle diameter of over 50 $\mu$m in the fiber aggregate was restricted below 1 wt %. The ceramic fibers of 15 wt % are put in a deflocculator with an agitator, thus forming 2% of a slurry solution of 750 wt %. In order for the colloidal silica solid content to reach 5% of the slurry solution of 750 wt %, the colloidal silica (solid content: 40 wt %) which is the inorganic binder was added as much as 94 wt %, and agitated for 3 minutes. Thereafter, the fibers of 15 wt % were put therein, and agitated for 10 minutes at 2000 rpm. Then, methyl cellulose (solid content: 0.5 wt %) which is the organic binder was added as much as 50 wt %, a polyacrylamide-based copolymer emulsion (solid content: 0.5 wt %) was added as much as 30 wt %, and agitated for 3 minutes at 600 rpm, respectively. A vacuum pressure was maintained between 0.47 and 0.61 atm for 3 minutes, thereby carrying out the vacuum-molding process. The molded body was dried for 30 minutes in a microwave heating device, and heated in an electric furnace for 2 hours at a temperature of 1300° C., thereby precipitating the mullite and zirconia crystals. FIGS. 1 and 2 are scanning electron microscope photographs showing the inner portion of the body. As shown therein, the ceramic fibers are evenly distributed in a three-dimensional shape. Referring to the circled portion of the high-magnification of FIG. 2, the colloidal silica which is the inorganic binder is efficiently bonded to the contact point of the fibers, not the surface of the fibers. In addition, in order to measure the mechanical property under the conditions, flexural strength measuring samples were fabricated. As a result of measuring the seven flexural strength measuring samples, the strength value is approximately 1.980±0.121 MPa at an average density of 200 kg/m$^3$, and a heat conductivity is approximately 0.19 W/mK at 1100° C.

Comparative Example 1

Under the same conditions as the example of the present invention, fibers of 15 wt % were added in order to correspond to 2% of a slurry solution of 750 wt %. A colloidal silica (solid content: 40 wt %) which is the inorganic binder was added as much as 94 wt % in order for the colloidal silica solid content to correspond to 5% of the slurry solution of 750 wt %, and agitated for 3 minutes. Thereafter, the fibers of 15 wt % were put therein, and agitated for 10 minutes at 2000 rpm. The vacuum pressure was maintained between 0.47 and 0.61 atm for 3 minutes, and a vacuum-molding process was performed, without adding an organic binder. Drying and heating steps were carried out identically to the example of the present invention, thereby fabricating the forming body. As compared with the example of the present invention, the orientation of the ceramic fibers was two dimensional. In addition, in the drying step of the forming body, the colloidal silica which is the inorganic binder was moved to the surface of the forming body in large quantities, and thus less bonded to the contact point of the fibers. In these conditions, flexural strength measuring samples were fabricated in order to measure the mechanical property. As a result of measuring the seven flexural strength measuring samples, a strength value is approximately between 1.246±0.224 MPa at 200 kg/m$^3$.

Comparative Example 2

Under the same conditions as the example of the present invention, the fibers of 15 wt % were added in order to correspond to 2% of a slurry solution of 750 wt %. The colloidal silica (solid content: 4 wt %) and the colloidal alumina (solid content: 4 wt %) which is the inorganic binder were mixed together, added as much as 20 wt %, and agitated for 10 minutes. A vacuum pressure was maintained for 3 minutes between 0.47 and 0.61 atm, and a vacuum-molding process was carried out. Drying and heating steps were performed identically to the example of the present invention, thereby fabricating the forming body. Although the orientation of the ceramic fibers was three dimensional, the inorganic binder was more bonded to the surface of the fibers than the contact point of the fibers, as compared with the example of the present invention. In these conditions, flexural strength measuring samples were fabricated in order to measure the mechanical property. As a result of measuring the seven flexural strength measuring samples, a strength value is approximately between 0.974±0.087 MPa at 200 kg/m$^3$.

Comparative Example 3

Figure 3:
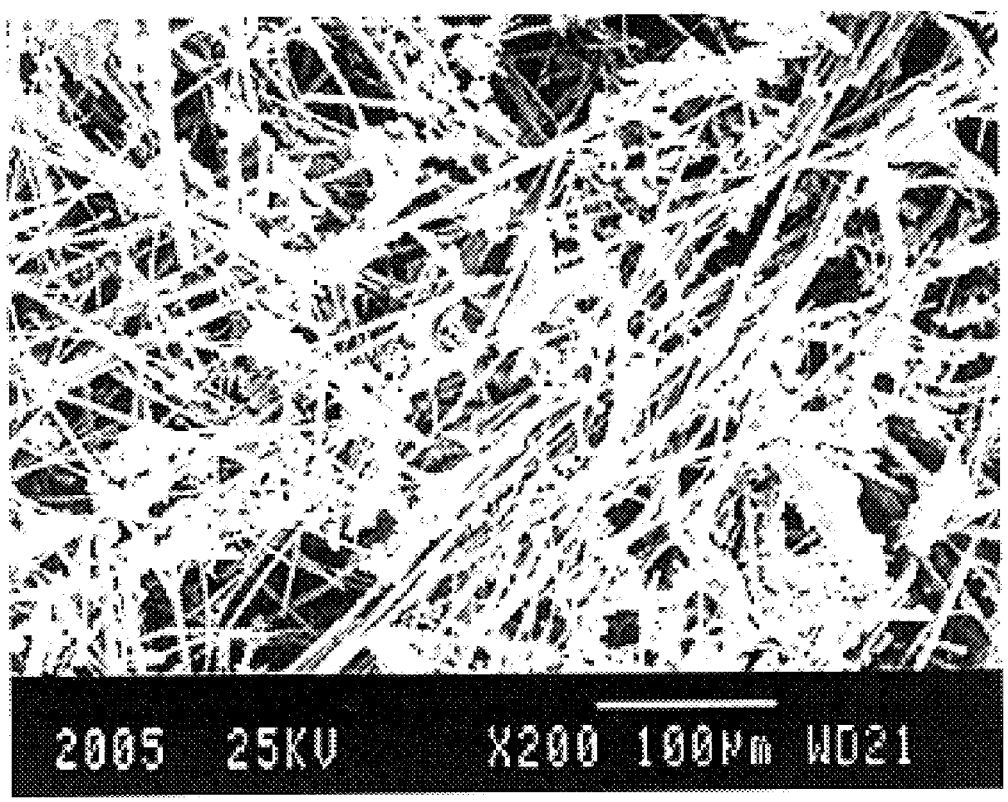
FIG. 3 is a scanning electron microscope photograph showing a conventional ceramic insulator.

For comparison with the example of the present invention, FIG. 3 is a scanning electron microscope photograph showing a general-purpose ceramic fiber high-temperature insulator. As shown therein, the organic/inorganic binder is aggregated between the ceramic fibers, and thus distributed inside in large quantities. Using a large amount of the binder increases the density of the ceramic insulator. Accordingly, it cannot be used for the products requiring high thermal and mechanical properties. In the general-purpose ceramic insulator, a strength value is approximately 0.320 MPa at 260 kg/m$^3$, and a heat conductivity is approximately 0.22 W/mK at 1100° C.

As described in the Example of the present invention and the Comparative Examples, as compared with when only the colloidal silica which is the inorganic binder was used as a binder for bonding the ceramic fibers, and when the colloidal silica and the colloidal alumina which are the inorganic binder were mixed and used, in the case that the methyl cellulose and the polyacrylamide-based copolymer emulsion were added to the colloidal silica which is the inorganic binder as much as 1.7 to 3.3 wt % of the fibers, the orientation of the fibers was three dimensional, and the fibers were evenly distributed without cracks or lamination. In addition, the binder was efficiently concentrated on the contact point between the fibers, thereby fabricating the ceramic insulator having a superior thermal and mechanical properties at a low density.

The ceramic insulator in accordance with the present invention can be efficiently utilized in the fields requiring a low load thereof. When the high-temperature ceramic insulator is fabricated according to the method of the present invention, it is possible to obtain products having good strength. Thus, it is expected to simplify installation works.

As the present invention may be embodied in several forms without departing from the spirit or essential characteristics thereof, it should also be understood that the above-described example is not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. A high strength, light weight ceramic insulator comprising:

alumina-silica based ceramic fiber containing zirconia which comprises 35 to 47 wt % silica, 30 to 50 wt % alumina and 15 to 23 wt % zirconia;

an organic binder present in a concentration of between 1.7 and 3.3 wt %, based on the weight of the ceramic fiber; and an inorganic binder present in a concentration of between 3 and 10 wt %, based on the weight of the ceramic fiber, wherein the organic and inorganic binders are concentrated at contact points between the ceramic fiber and wherein the density of the ceramic fiber is between 120 and 350 kg/m$^3$.

2. The ceramic insulator according to claim 1, wherein an average length of the ceramic fiber is between 100 and 900 μm.

3. The ceramic insulator according to claim 1, wherein a content of shots having a particle diameter of over 50 μm in the ceramic fiber is below 1 wt %.

4. The ceramic insulator according to claim 1, wherein the inorganic binder is colloidal silica or colloidal alumina.

5. The ceramic insulator according to claim 1, wherein the organic binder is a methyl cellulose or polyacrylamide-based copolymer emulsion.

* * * * *